United States Patent
Chin et al.

(10) Patent No.: US 8,917,695 B2
(45) Date of Patent: Dec. 23, 2014

(54) METHODS AND SYSTEMS FOR PARALLEL ACQUISITION OF SYSTEM INFORMATION FROM MULTIPLE BASE STATIONS

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1423 days.

(21) Appl. No.: 12/211,897

(22) Filed: Sep. 17, 2008

(65) Prior Publication Data

US 2010/0067448 A1    Mar. 18, 2010

(51) Int. Cl.
    *H04J 1/16*    (2006.01)
(52) U.S. Cl.
    USPC .......................................... 370/330; 370/436
(58) Field of Classification Search
    USPC .................................. 370/330, 436
    See application file for complete search history.

(56) References Cited

U.S. PATENT DOCUMENTS

| | | | |
|---|---|---|---|
| 7,471,942 B2 * | 12/2008 | Subramanian et al. | .... 455/343.2 |
| 2005/0078654 A1 | 4/2005 | Rick et al. | |
| 2006/0029011 A1 * | 2/2006 | Etemad et al. | ................ 370/311 |
| 2007/0168577 A1 * | 7/2007 | Kim et al. | ........................ 710/15 |
| 2010/0304667 A1 * | 12/2010 | Chen et al. | ........................ 455/9 |

FOREIGN PATENT DOCUMENTS

| | | |
|---|---|---|
| JP | 2010520667 A | 6/2010 |
| KR | 20040050056 | 6/2004 |
| RU | 2183909 C2 | 6/2002 |
| WO | 0010336 A2 | 2/2000 |
| WO | WO03039188 | 5/2003 |
| WO | 2008106353 A2 | 9/2008 |

OTHER PUBLICATIONS

International Search Report and Written Opinion—PCT/US2009/057035, ISA/EPO—Dec. 10, 2009.
Thakare, K. et al., "An Enhanced Cell Scanning method for IEEE 802.16", IEEE C80216maint-08/113r2, Apr. 19, 2008, URL: http://www.ieee802.org/16/maint/contrib/C80216maint-08_113r2.doc.
Taiwan Search Report—TW098131282—TIPO—Apr. 29, 2013.

* cited by examiner

*Primary Examiner* — Phuc Tran
(74) *Attorney, Agent, or Firm* — Tyler J. Overall

(57) ABSTRACT

A method for parallel acquisition of system information from multiple base stations may be implemented by a mobile station. The method may include determining scheduled times for transmission of the system information from the multiple base stations based on parameters included in messages from the multiple base stations. The method may also include creating a schedule list that comprises the scheduled times. The method may further include tuning to the base stations at the scheduled times that are specified in the schedule list in order to receive the system information from the base stations.

26 Claims, 12 Drawing Sheets

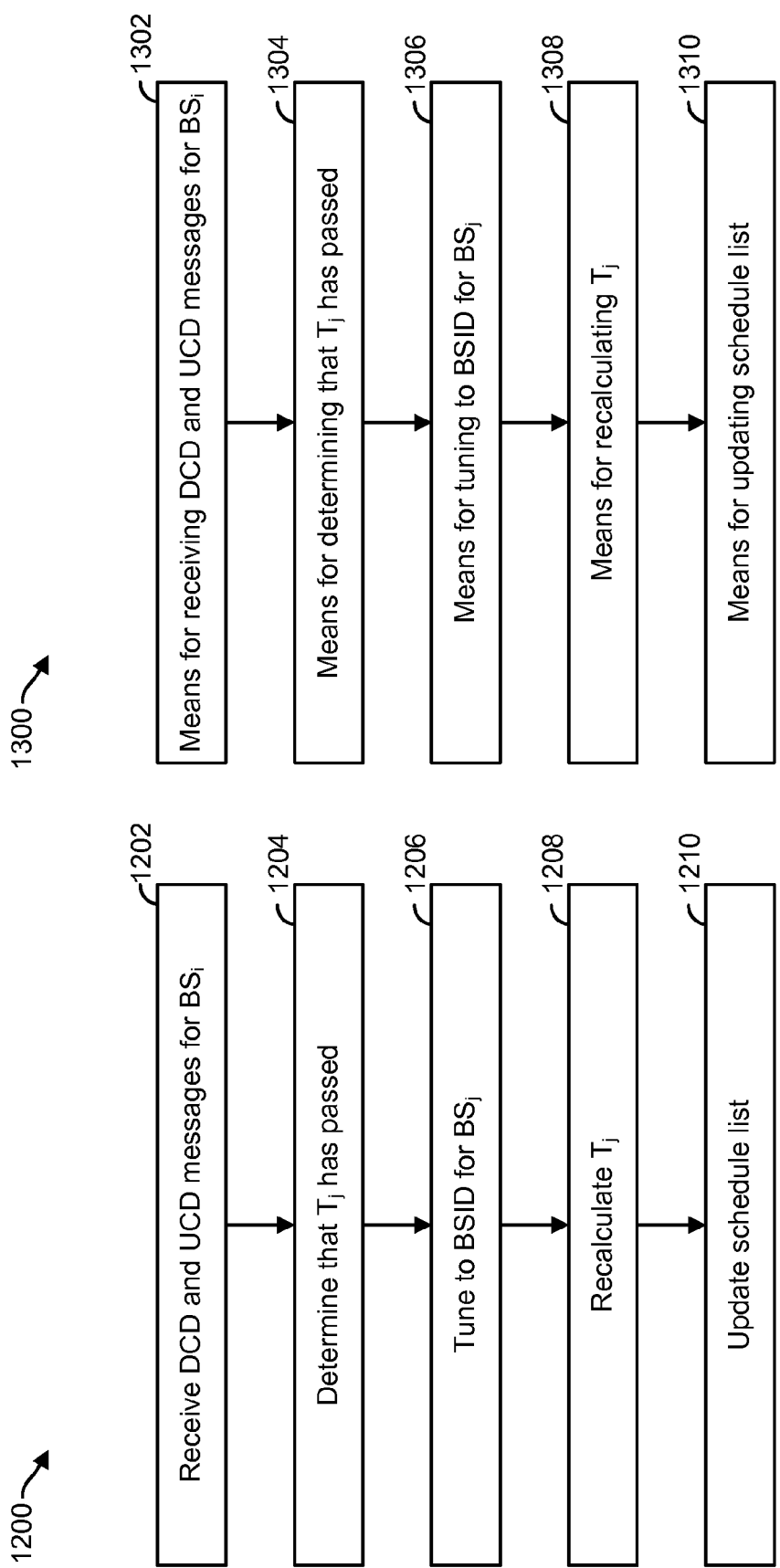

US 8,917,695 B2

METHODS AND SYSTEMS FOR PARALLEL ACQUISITION OF SYSTEM INFORMATION FROM MULTIPLE BASE STATIONS

TECHNICAL FIELD

The present disclosure relates generally to communication systems. More specifically, the present disclosure relates to methods and apparatus for parallel acquisition of system information corresponding to multiple base stations.

BACKGROUND

As used herein, the term "mobile station" refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of mobile stations, each of which may be serviced by a base station. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication network (e.g., bandwidth and transmit power) may be shared among multiple mobile stations. A variety of multiple access techniques are known, including code division multiple access (CDMA), time division multiple access (TDMA), frequency division multiple access (FDMA), and orthogonal frequency division multiple access (OFDMA).

Benefits may be realized by improved methods and apparatus related to the operation of wireless communication networks.

BRIEF DESCRIPTION OF THE DRAWINGS

FIG. 12 illustrates an example of a method that may be implemented by a mobile station if there is a conflict between the scheduled times for DCD and UCD transmission from different base stations;

FIG. 13 illustrates means-plus-function blocks corresponding to the method of FIG. 12;

SUMMARY

Figure 1:
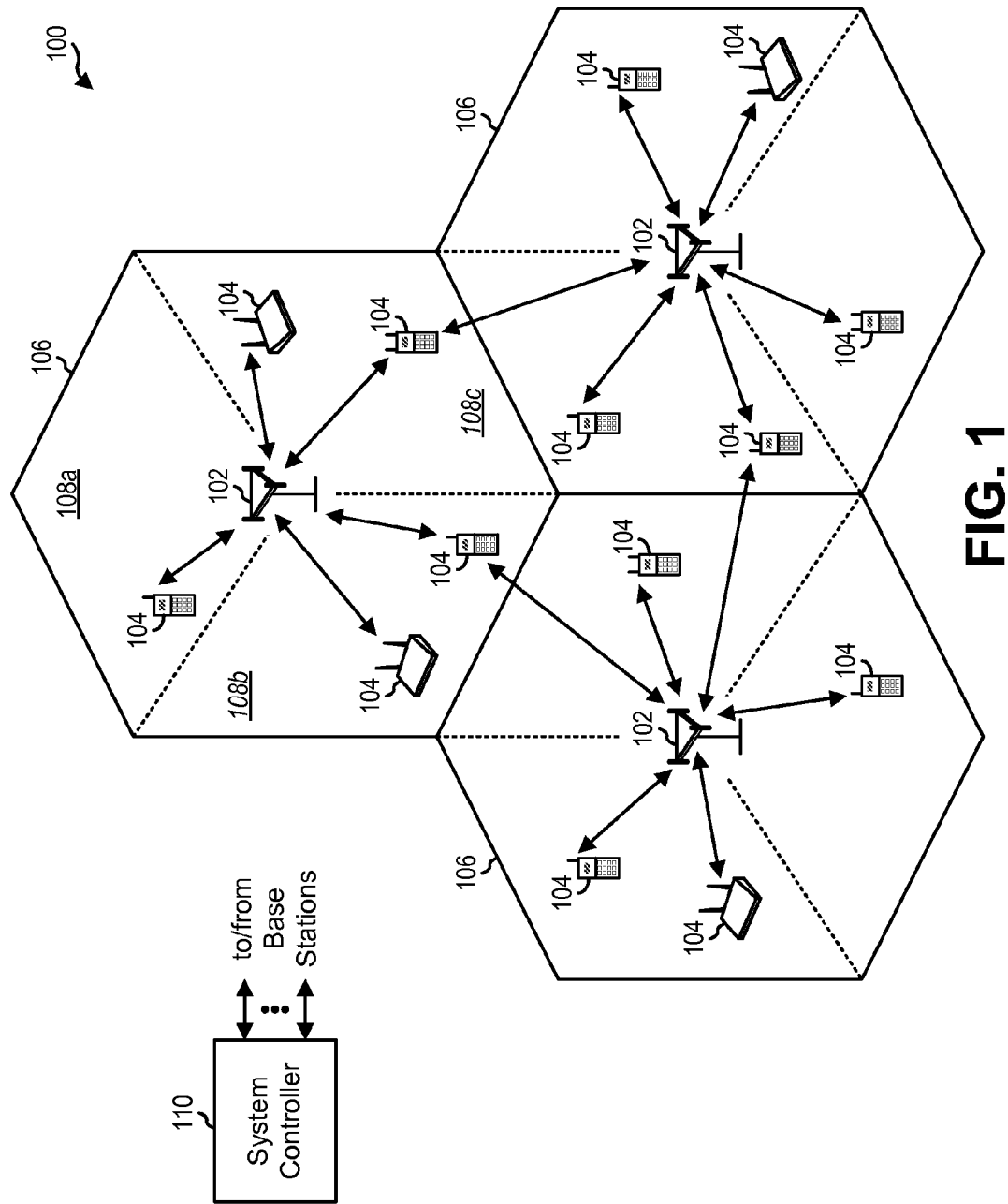
FIG. 1 illustrates a wireless communication system with multiple base stations and multiple mobile stations.

A method for parallel acquisition of system information from multiple base stations is disclosed. The method may be implemented by a mobile station. The method may include determining scheduled times for transmission of the system information from the multiple base stations based on parameters included in messages from the multiple base stations. The method may also include creating a schedule list that comprises the scheduled times. The method may also include tuning to the base stations at the scheduled times that are specified in the schedule list in order to receive the system information from the base stations.

A mobile station that is configured for parallel acquisition of system information from multiple base stations is disclosed. The mobile station may include a processor. The mobile station may also include memory in electronic communication with the processor. The mobile station may also include instructions stored in the memory. The instructions may be executable by the processor to determine scheduled times for transmission of the system information from the multiple base stations based on parameters included in messages from the multiple base stations. The instructions may also be executable to create a schedule list that comprises the scheduled times. The instructions may also be executable to tune to the base stations at the scheduled times that are specified in the schedule list in order to receive the system information from the base stations.

A mobile station that is configured for parallel acquisition of system information from multiple base stations is disclosed. The mobile station may include means for determining scheduled times for transmission of the system information from the multiple base stations based on parameters included in messages from the multiple base stations. The mobile station may also include means for creating a schedule list that comprises the scheduled times. The mobile station may also include means for tuning to the base stations at the scheduled times that are specified in the schedule list in order to receive the system information from the base stations.

A computer-program product for parallel acquisition of system information from multiple base stations by a mobile station is disclosed. The computer-program product may include a computer-readable medium having instructions thereon. The instructions may include code for determining scheduled times for transmission of the system information from the multiple base stations based on parameters included in messages from the multiple base stations. The instructions may also include code for creating a schedule list that comprises the scheduled times. The instructions may further include code for tuning to the base stations at the scheduled times that are specified in the schedule list in order to receive the system information from the base stations.

DETAILED DESCRIPTION

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

Some of the examples described herein are relevant to wireless communication networks that are configured in accordance with WiMAX standards. However, these examples should not be interpreted as limiting the scope of the present disclosure, which may be applicable to many other communication systems.

FIG. 1 shows a wireless communication system 100 with multiple base stations (BS) 102 and multiple mobile stations (MS) 104. A base station 102 is a station that communicates with the mobile stations 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100, and each mobile station 104 may be stationary or mobile. A mobile station 104 may also be called, and may contain some or all of the functionality of, a terminal, an access terminal, a user equipment, a subscriber unit, a station, etc. A mobile station 104 may be a cellular phone, a personal digital assistant (PDA), a wireless device, a wireless modem, a handheld device, a laptop computer, etc. A mobile station 104 may communicate with zero, one, or multiple base stations 104 on the downlink (DL) and/or uplink (UL) at any given moment. The downlink (or forward link) refers to the communication link from the base stations 102 to the mobile stations 104, and the uplink (or reverse link) refers to the communication link from the mobile stations 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

Figure 2:
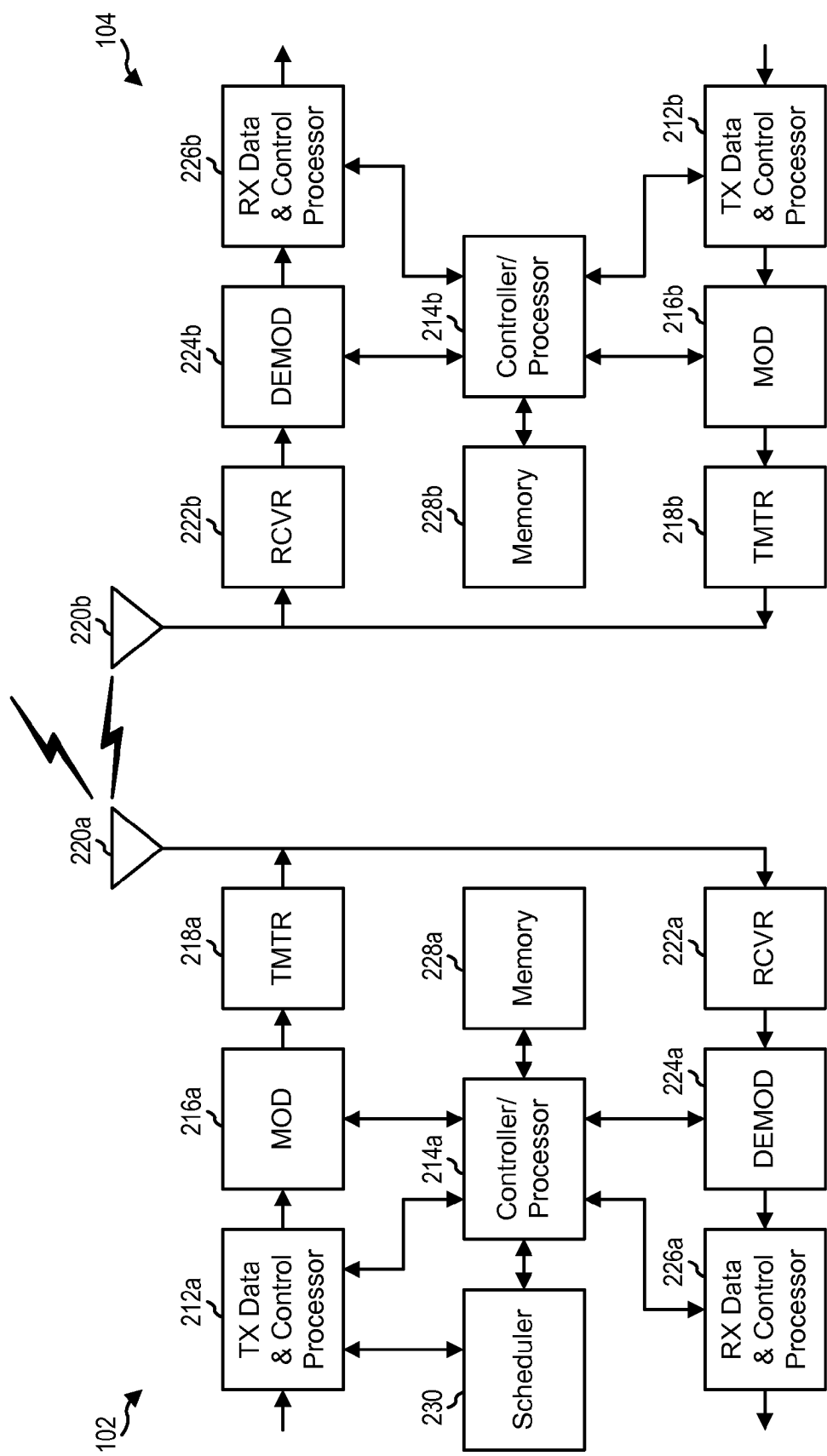
FIG. 2 illustrates a block diagram of a design of a base station and a mobile station.

FIG. 2 shows a block diagram of a design of a base station 102 and a mobile station 104, which may be one of the base stations 102 and one of the mobile stations 104 in FIG. 1. At the base station 102, a transmit (TX) data and control processor 212a may receive traffic data from a data source (not shown) and/or control information from a controller/processor 214a. The processor 212a may process (e.g., format, encode, interleave, and symbol map) the traffic data and control information and provide modulation symbols. A modulator (MOD) 216a may process the modulation symbols (e.g., for OFDM) and provide output chips. A transmitter (TMTR) 218a may process (e.g., convert to analog, amplify, filter, and upconvert) the output chips and generate a downlink signal, which may be transmitted via an antenna 220a.

At the mobile station 104, an antenna 220b may receive the downlink signals from the base station 102 and other base stations 102 and may provide a received signal to a receiver (RCVR) 222b. The receiver 222b may condition (e.g., filter, amplify, downconvert, and digitize) the received signal and provide received samples. A demodulator (DEMOD) 224b may process the received samples (e.g., for OFDM) and provide demodulated symbols. A receive (RX) data and control processor 226b may process (e.g., symbol demap, deinterleave, and decode) the demodulated symbols to obtain decoded data and control information for the mobile station 104.

On the uplink, at the mobile station 104, data and control information to be sent by the mobile station 104 may be processed by a TX data and control processor 212b, modulated by a modulator 216b, conditioned by a transmitter 218b, and transmitted via an antenna 220b. At the base station 102, the uplink signals from the mobile station 104 and possibly other mobile stations 104 may be received by an antenna 220a, conditioned by a receiver 222a, demodulated by a demodulator 224a, and processed by an RX data and control processor 226a to recover the data and control information sent by the mobile station 104. In general, the processing for uplink transmission may be similar to or different from the processing for downlink transmission.

Controllers/processors 214a and 214b may direct the operation at the base station 102 and the mobile station 104, respectively. Memories 228a and 228b may store data and program codes for the base station 102 and the mobile station 104, respectively. A scheduler 230 may schedule mobile stations 104 for downlink and/or uplink transmission and may provide assignments of system resources.

Figure 3:
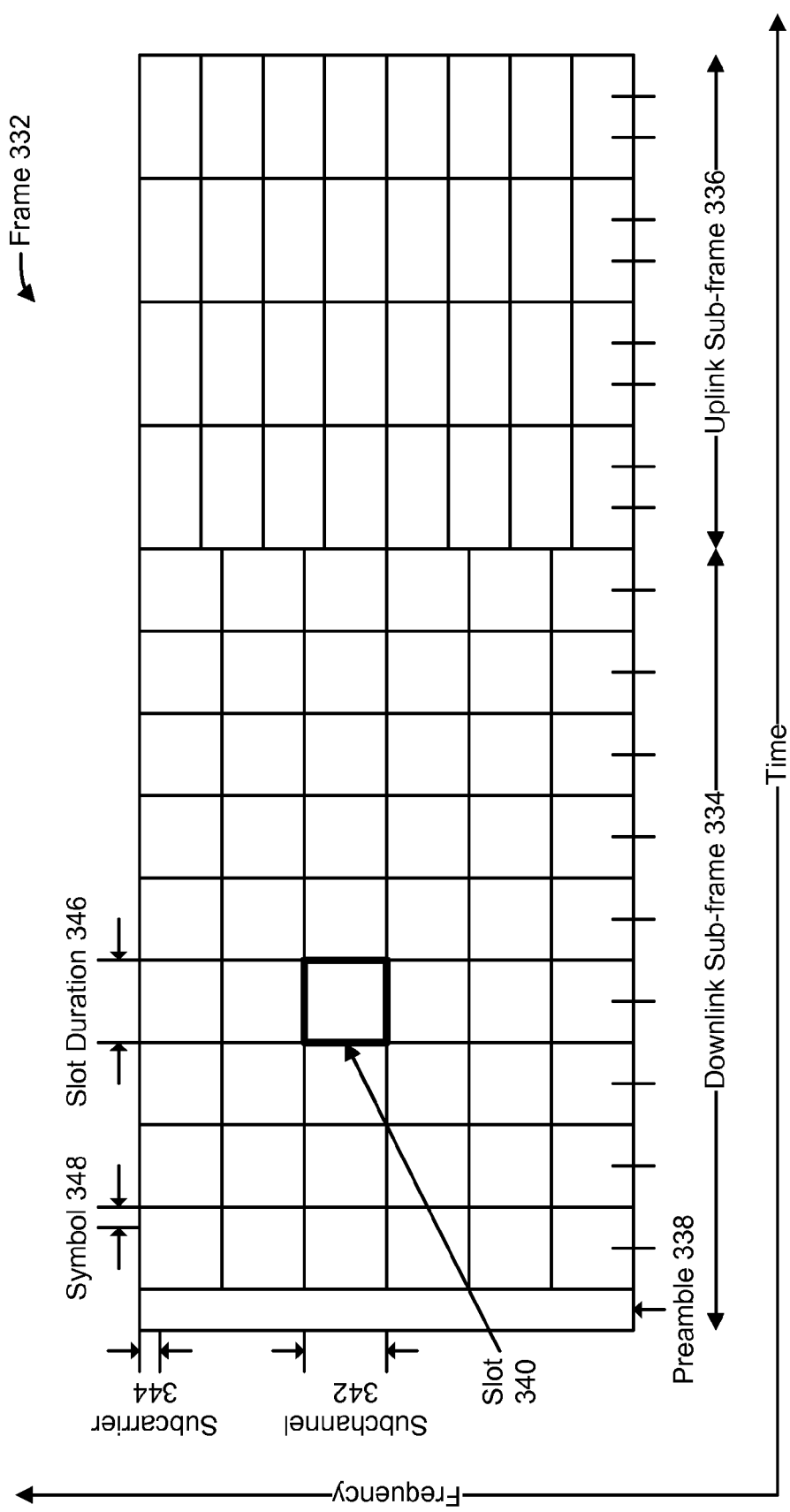
FIG. 3 illustrates an example showing certain aspects of the structure of a frame in a WiMAX network.

FIG. 3 illustrates an example showing certain aspects of the structure of a frame 332 in a WiMAX network. In a WiMAX network, a frame 332 is a time interval of constant length. For time division duplex (TDD) operation, each frame 332 is divided into a downlink (DL) sub-frame 334 and an uplink (UL) sub-frame 336. The downlink sub-frame 334 begins with a preamble 338.

In a WiMAX network, a slot 340 is the smallest unit to allocate bandwidth to users. A slot 340 is a subchannel 342 (i.e., a group of subcarriers 344) over a slot duration 346 (i.e., a certain number of symbols 348).

Figure 4:
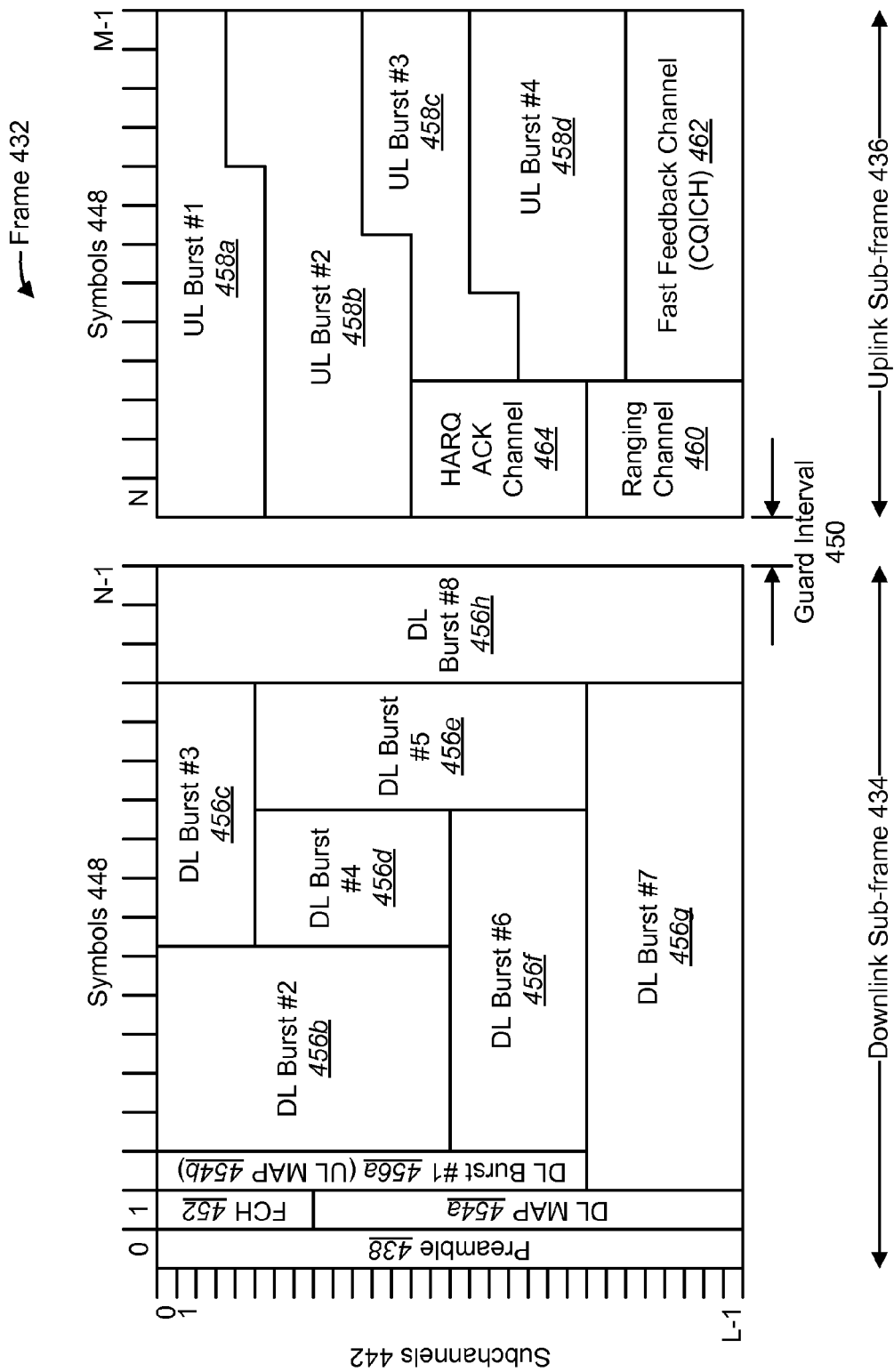
FIG. 4 illustrates an example showing certain additional aspects of the structure of a frame in a WiMAX network.

FIG. 4 illustrates an example showing certain additional aspects of the structure of a frame 432 in a WiMAX network. The frame 432 includes a downlink sub-frame 434 and an uplink sub-frame 436, separated by a guard interval 450. The frame 432 is transmitted over L subchannels 442. There are a total of M symbols 448 in the frame 432, N symbols 448 in the downlink sub-frame 434 and M-N symbols 448 in the uplink sub-frame 436.

The downlink sub-frame 434 includes a preamble 438. The preamble 438 is used for physical layer procedures, such as time and frequency synchronization and initial channel estimation. The downlink sub-frame 434 also includes a frame control header (FCH) 452. The FCH 452 provides frame configuration information, such as the MAP message length, the modulation and coding scheme, and the usable subcarriers.

Multiple users are allocated data regions within the frame 432, and these allocations are specified in the downlink MAP message 454a and the uplink MAP message 454b. The MAP messages 454a-b include the burst profile for each user, which defines the modulation and coding schemes that are used.

The downlink sub-frame 434 also includes multiple downlink bursts 456a-h. The first downlink burst 456a is typically the uplink MAP message 454b. The downlink bursts 456a-h may be of varying size and type, and may carry data for several users.

The uplink sub-frame 436 includes multiple uplink bursts 458a-d, which may be from different users. The uplink sub-frame 436 also includes a ranging channel 460, which may be used to perform closed-loop frequency, time, and power adjustments during network entry as well as periodically afterward. The ranging channel 460 may also be used by mobile stations to make uplink bandwidth requests.

The uplink sub-frame 436 also includes a channel-quality indicator channel (CQICH) 462 for the mobile stations to feed back channel-quality information that can be used by the scheduler at the base station. The CQICH 462 may also be referred to as a fast feedback channel 462. The uplink sub-frame 436 also includes a hybrid automatic repeat request (HARQ) acknowledgement (ACK) channel 464, which may be used by mobile stations to feed back downlink acknowledgements In the Mobile WiMAX network, the mobile station (MS) scans and acquires the base station's (BS) parameters, including its preamble index, some key parameters in the DL-MAP, such as the 24-bit frame number, frame duration, 48-bit BSID (Base Station ID), and DCD (Downlink Channel Descriptor) and UCD (Uplink Channel Descriptor) messages. This processing may occur during initial network selection, preparation for handoff or cell reselection in idle mode. When a mobile station is in the coverage area of multiple base stations, the mobile station may need to acquire all of the information for all of the base stations. One method is to acquire the information for the base stations sequentially. However, the DCD and the UCD messages may be transmitted periodically with a maximum time period of 10 seconds. Therefore, there may be an undesirable amount of latency involved with such a sequential approach, i.e., it may require a significant amount of time to complete acquisition of the information for all of the base stations.

The present disclosure proposes a parallel acquisition method of DCD and UCD messages for multiple base stations. The techniques disclosed herein may reduce the latency involved in acquiring system information for multiple base stations.

Figure 5:
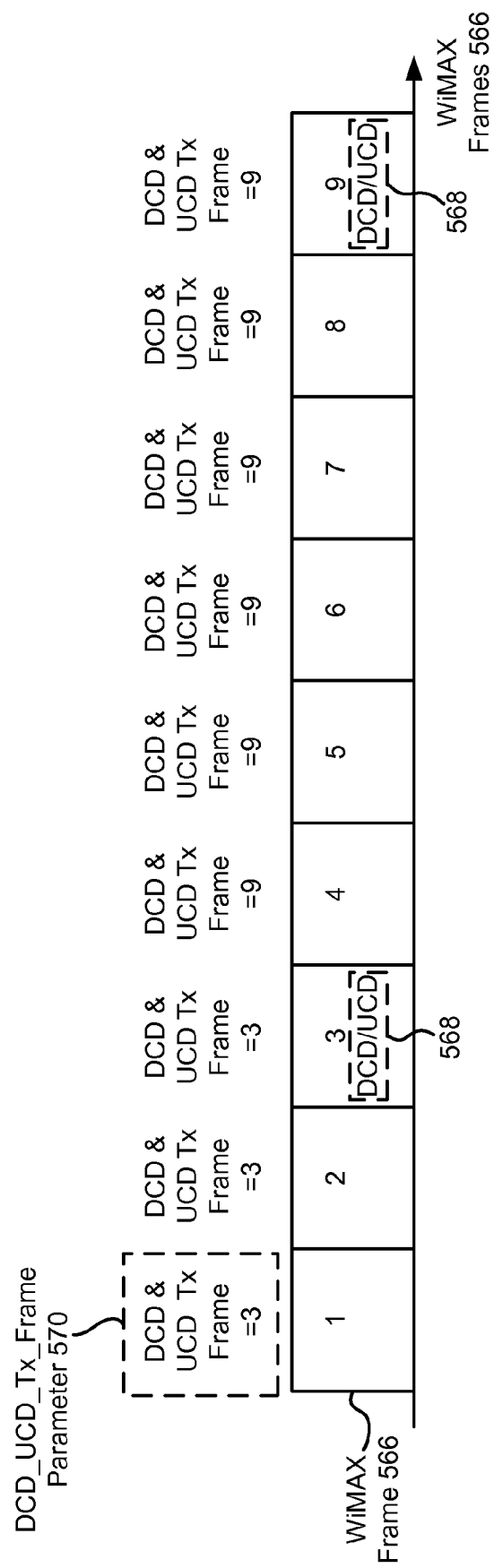
FIG. 5 illustrates the usage of the DCD_UCD_TX_Frame parameter in a WiMAX network.

Reference is now made to FIG. 5. WiMAX standards specify that each WiMAX frame 566 includes the frame number that the next DCD and UCD messages 568 are transmitted. This information may be carried by the Broadcast Control Pointer Information Element (IE) in the DL-MAP message. The Broadcast Control Pointer IE includes a message parameter that is referred to as the DCD_UCD_TX_Frame parameter 570. The DCD_UCD_TX_Frame parameter 570 indicates the seven least significant bits of the 24-bit frame number in which the DCD and UCD messages 568 are transmitted. FIG. 5 illustrates the usage of the DCD_UCD_TX_Frame parameter 570.

Figures 6, 7:
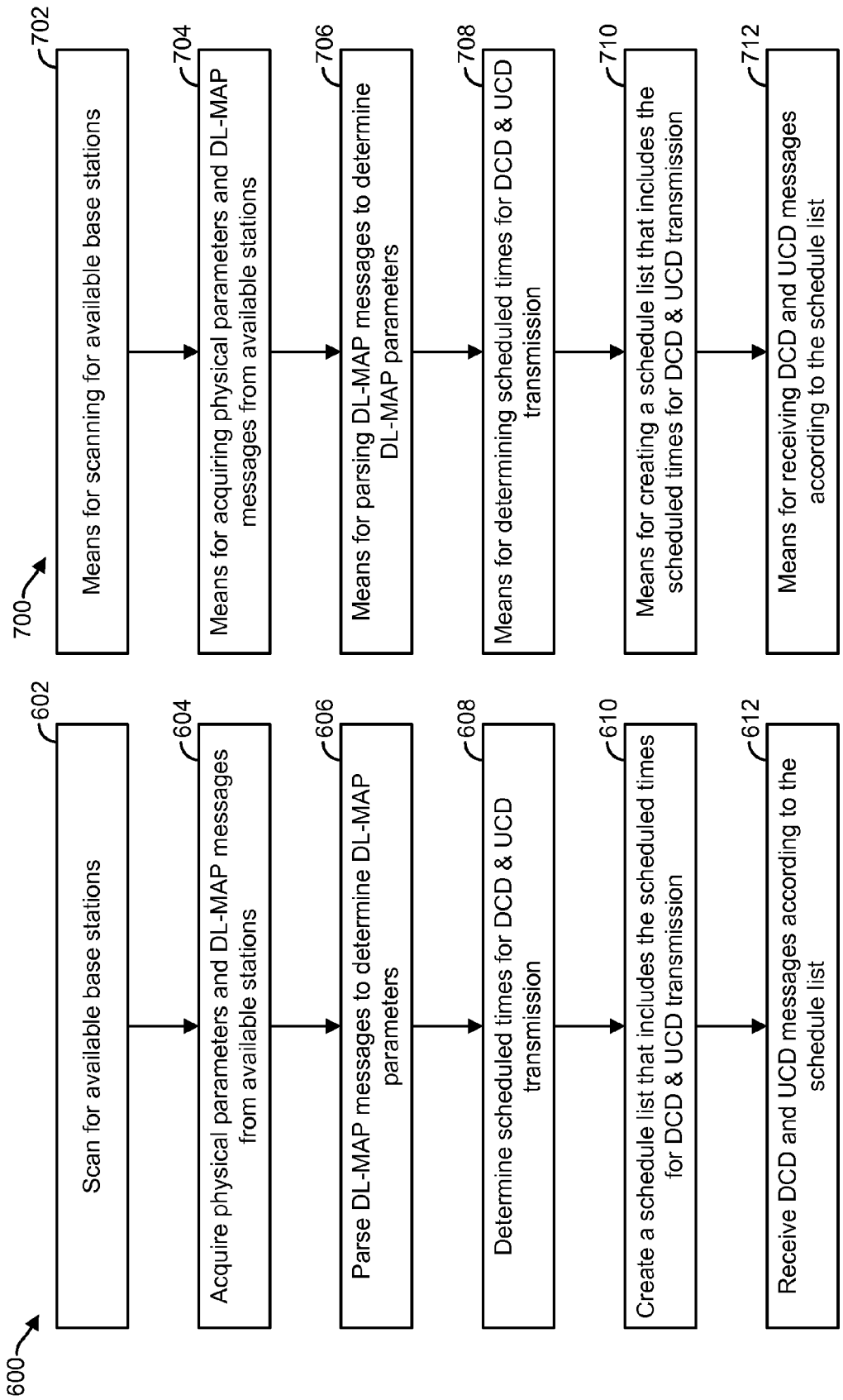
FIG. 6 illustrates an example of a method for acquiring DCD and UCD messages for multiple base stations in parallel.
FIG. 7 illustrates means-plus-function blocks corresponding to the method of FIG. 6.

Reference is now made to FIG. 6. FIG. 6 illustrates an example of a method 600 for acquiring DCD and UCD messages for multiple base stations in parallel. The depicted method 600 may be implemented by a mobile station in a wireless communication network, such as a WiMAX network.

In the depicted method 600, a mobile station scans 602 for available base stations. The mobile station acquires 604 physical parameters and DL-MAP messages from available base stations. The physical parameters may include the frequency assignment index, the preamble index, and the frame boundary. In the present discussion, it will be assumed that the mobile station acquires 604 physical parameters and DL-MAP messages from multiple base stations.

The mobile station then parses 606 the received DL-MAP messages to determine certain parameters, such as the current_frame_number, the frame_duration, the base station identifier (BSID), and the DCD_UCD_Tx_Frame. These parameters will be referred to herein as DL-MAP parameters. The mobile station uses the DL-MAP parameters to determine the 608 scheduled times for DCD and UCD transmission.

More specifically, for each available base station, the mobile station parses 606 the DL-MAP message that is received from the base station. The mobile station then uses the DL-MAP parameters (i.e., the current_frame_number, the frame_duration, the BSID, and the DCD_UCD_Tx_Frame) that are determined by parsing the DL-MAP message to determine 608 the time at which the DCD and UCD messages will be transmitted by the base station. This will be explained in greater detail below.

A schedule list may be created 610. The schedule list may include the scheduled times for DCD and UCD transmission frames for all available base stations. The mobile station may then receive 612 DCD and UCD messages according to the schedule list. The mobile station may choose the earliest scheduled time in the schedule list to acquire the DCD and UCD messages.

The method 600 of FIG. 6 described above may be performed by various hardware and/or software component(s) and/or module(s) corresponding to the means-plus-function blocks 700 illustrated in FIG. 7. In other words, blocks 602 through 612 illustrated in FIG. 6 correspond to means-plus-function blocks 702 through 712 illustrated in FIG. 7.

Figure 8:
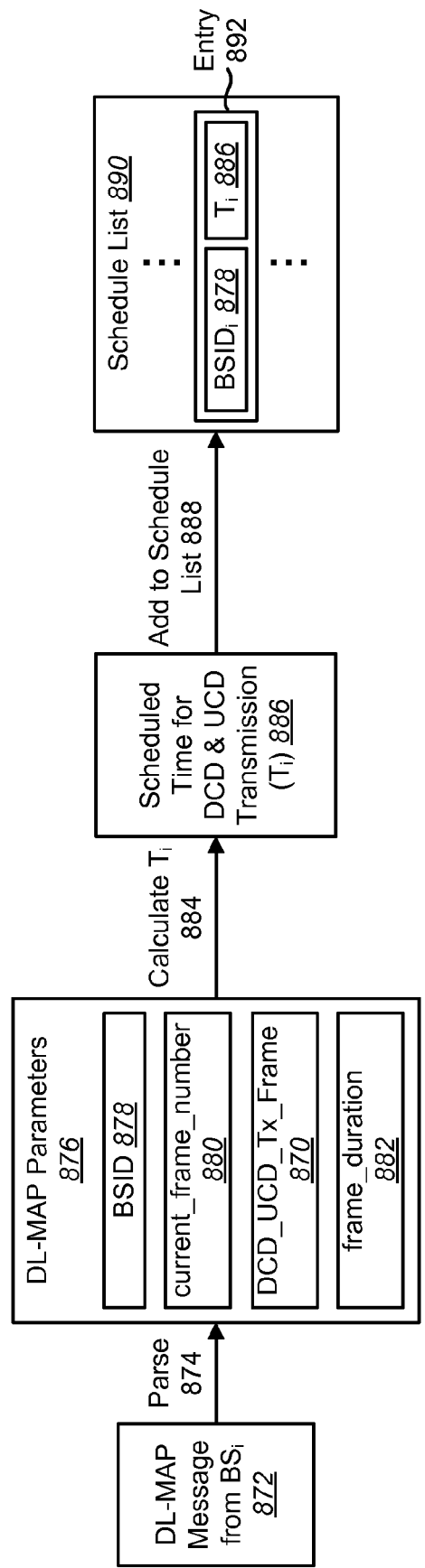
FIG. 8 illustrates an example showing how the scheduled time for DCD and UCD transmission for a particular base station may be determined.

Reference is now made to FIG. 8. FIG. 8 illustrates an example showing how the scheduled time for DCD and UCD transmission for a particular base station (referred to as $BS_i$) may be determined. The scheduled time for DCD and UCD transmission for $BS_i$ will be referred to as $T_i$.

When a DL-MAP message 872 from $BS_i$ is acquired, then the DL-MAP message may be parsed 874 in order to determine the DL-MAP parameters 876. The DL-MAP parameters 876 may include a base station identifier (abbreviated BSID) 878, a current_frame_number parameter 880, a DCD_UCD_TX_Frame parameter 870, and a frame_duration parameter 882. The BSID 878 is an identifier that uniquely identifies the base station relative to other base stations. The current_frame_number parameter 880 indicates the frame number in which the DL-MAP message was received. The DCD_UCD_TX_Frame parameter 870 indicates the frame number in which the DCD and UCD messages will be transmitted from $BS_i$. The frame_duration parameter 882 indicates the duration of a single frame.

The DL-MAP parameters 876 may be used to calculate 884 the scheduled time for DCD and UCD transmission ($T_i$) 886. If $S_t$ is the time when the current frame starts, $T_i$ may then be determined as:

$$T_i = S_t + (\text{current\_frame\_number} - \text{DCD\_UCD\_}Tx\_\text{Frame}) \bmod 128 * \text{frame\_duration} \quad (1)$$

The mod 128 operation is included in equation (1) because the current WiMAX standards define that only 7 bits are available in the DCD_UCD_Tx_Frame parameter.

After $T_i$ 886 is calculated 844, $T_i$ 886 may then be added 888 to a schedule list 890. The schedule list 890 may include a separate entry 892 for each available base station. Each entry 892 may include the BSID 878 for the corresponding base station, as well as the scheduled time 886 for DCD and UCD transmission for that base station.

Figure 9:
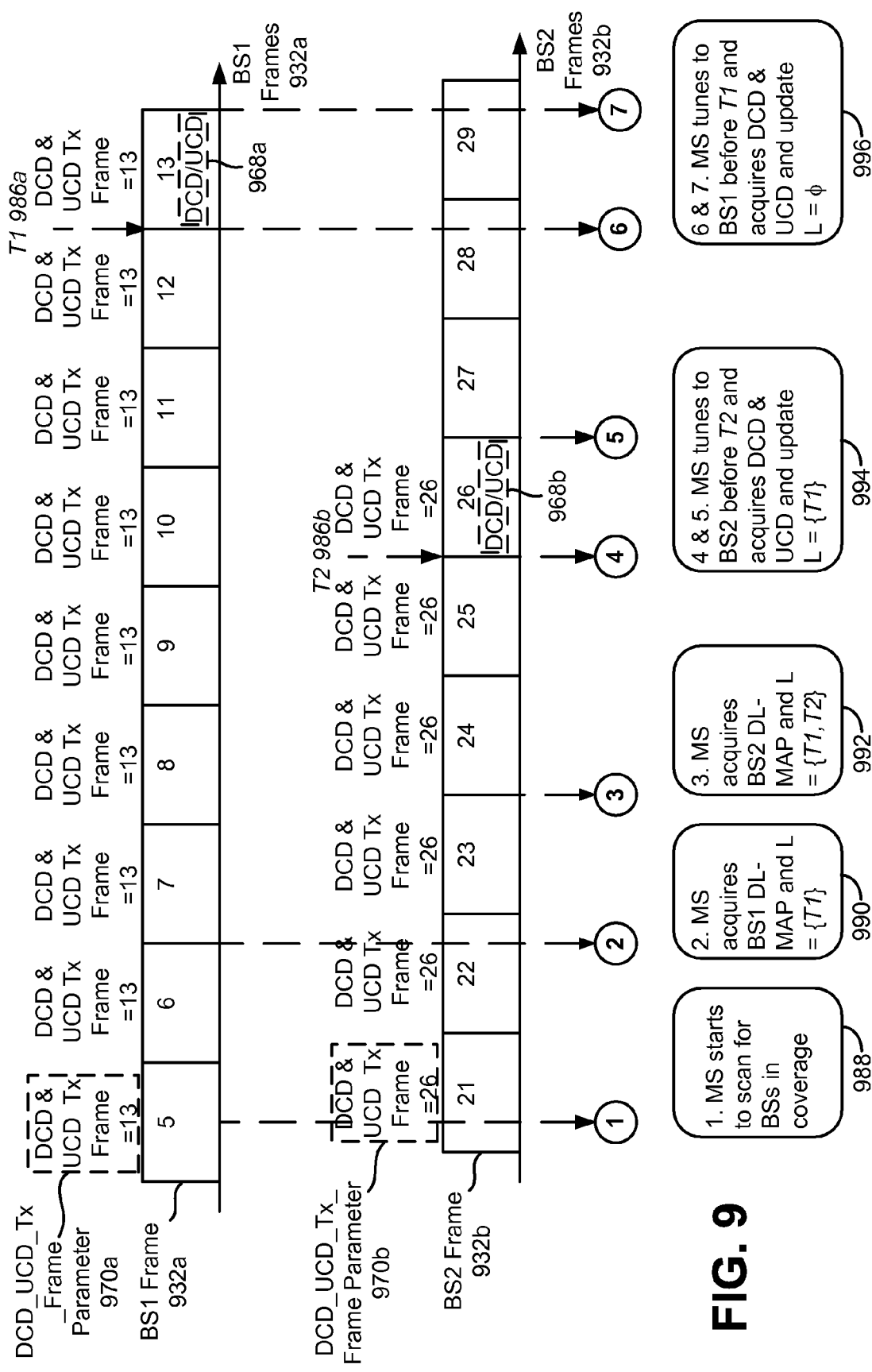
FIG. 9 illustrates an example of the parallel acquisition method of FIG. 6.

Reference is now made to FIG. 9. FIG. 9 illustrates an example of the parallel acquisition method 600 of FIG. 6. In this example, it will be assumed that there are two available base stations, referred to as BS1 and BS2. FIG. 9 shows frames 932a that are received from BS1, as well as frames 932b that are received from BS2.

Each frame 932a from BS1 includes the DCD_UCD_TX_Frame parameter 970a. As discussed above, the DCD_UCD_TX_Frame parameter 970a indicates the seven least significant bits of the 24-bit frame number in which the DCD and UCD messages 968a are transmitted from BS1. Similarly, each frame 932b from BS2 includes the DCD_UCD_TX_Frame parameter 970b, which indicates the seven least significant bits of the 24-bit frame number in which the DCD and UCD messages 968b are transmitted from BS2.

At time point 1 (designated ① in FIG. 9), a mobile station starts to scan 988 for available base stations in its coverage area. At time point 2, the mobile station acquires 990 the DL-MAP message from BS1. The mobile station determines the scheduled time for DCD and UCD transmission from BS1. This value will be referred to as T1 986a. The mobile station then adds T1 986a to the schedule list, which will be referred to as L.

At time point 3, the mobile station acquires 992 the DL-MAP message from BS2. The mobile station determines the scheduled time for DCD and UCD transmission from BS2. This value will be referred to as T2 986b. The mobile station adds T2 986b to the schedule list (L).

The mobile station may choose the earliest scheduled time in the schedule list to acquire the DCD and UCD messages. Thus, at time point 4, the mobile station tunes 994 to BS2 before T2 986b and acquires the DCD and UCD messages from BS2. At time point 5, when the DCD and UCD messages have been successfully acquired, the mobile station updates 994 the schedule list by deleting T2 986b from the schedule list.

At time point 6, the mobile station tunes 996 to BS1 before T1 986a and acquires the DCD and UCD messages from BS1. At time point 7, after the DCD and UCD messages from BS1 have been successfully acquired, the mobile station updates 996 the schedule list by deleting T1 986a from the schedule list.

Figure 10:
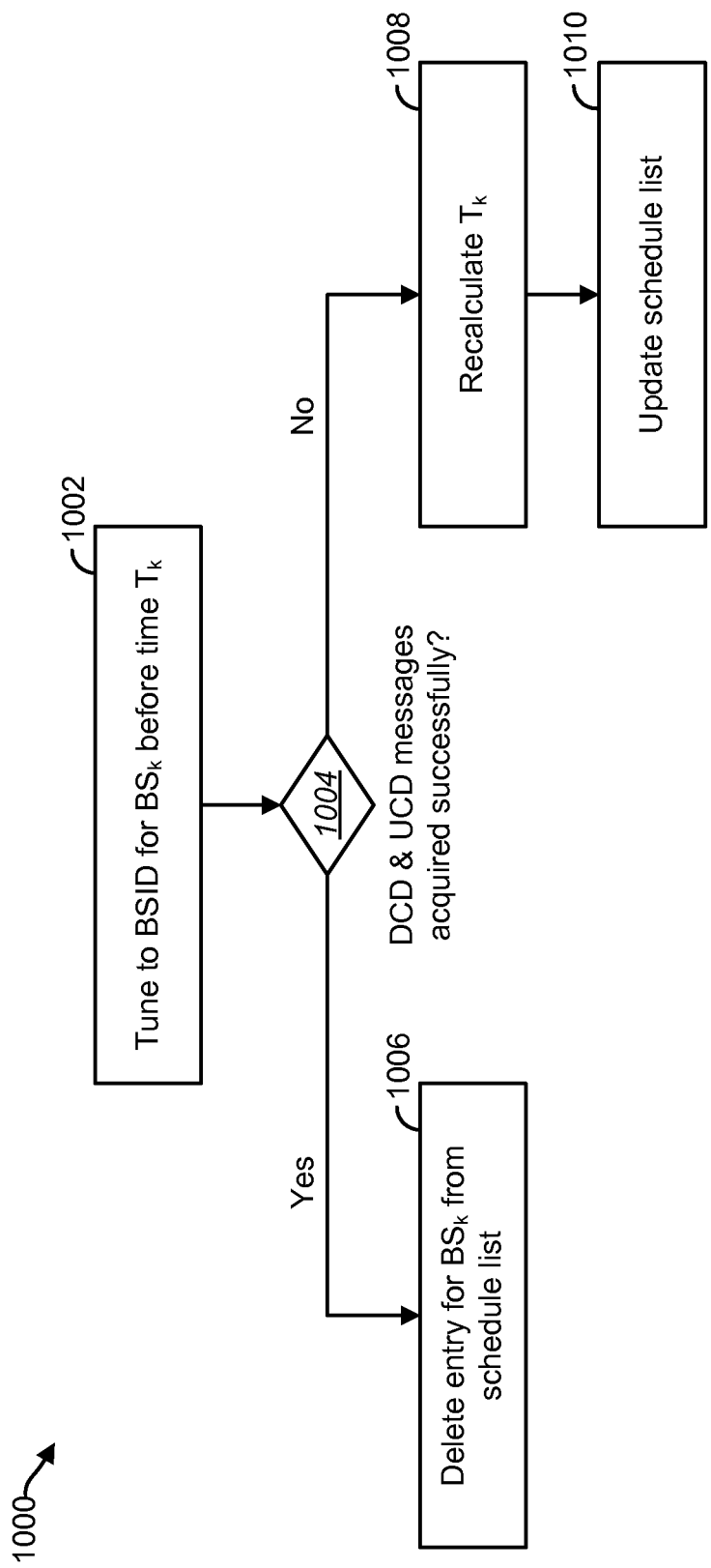
FIG. 10 illustrates an example of a method that may be implemented by a mobile station if the mobile station does not receive the DCD and UCD messages for a particular base station according to the scheduled time.

Reference is now made to FIG. 10. FIG. 10 illustrates an example of a method 1000 that may be implemented by a mobile station if the mobile station does not receive the DCD and UCD messages for a particular base station according to the scheduled time. The base station from which the DCD and UCD messages are not received will be referred to as $BS_k$ in the present discussion. The scheduled time for DCD and UCD transmission from $BS_k$ will be referred to as $T_k$.

When the mobile station does not receive DCD and UCD messages for $BS_k$ at time $T_k$, it can be because the DCD_UCD_Tx_Frame parameter has only 7 bits and therefore it can only indicate the time up to 128*frame_duration (i.e., 128*5 ms=640 ms when frame_duration=5 ms), while the time period of DCD and UCD transmission can be up to 10 seconds. In this case, the mobile station may use equation (1) above to recalculate $T_k$ and update the schedule list with the recalculated $T_k$.

In the depicted method 1000, the mobile station tunes 1002 to the BSID for $BS_k$ before the scheduled time for DCD and UCD transmission from $BS_k$ ($T_k$). The mobile station may then attempt to acquire the DCD and UCD messages from $BS_k$.

At some point, the mobile station may make a determination 1004 about whether the DCD and UCD messages have been acquired successfully. If they have been acquired successfully, then the mobile station may delete 1006 the entry for $BS_k$ from the schedule list. However, if the DCD and UCD messages are not acquired successfully, then the mobile station may recalculate 1008 $T_k$, and then update 1010 the schedule list to include the recalculated $T_k$.

Figure 11:
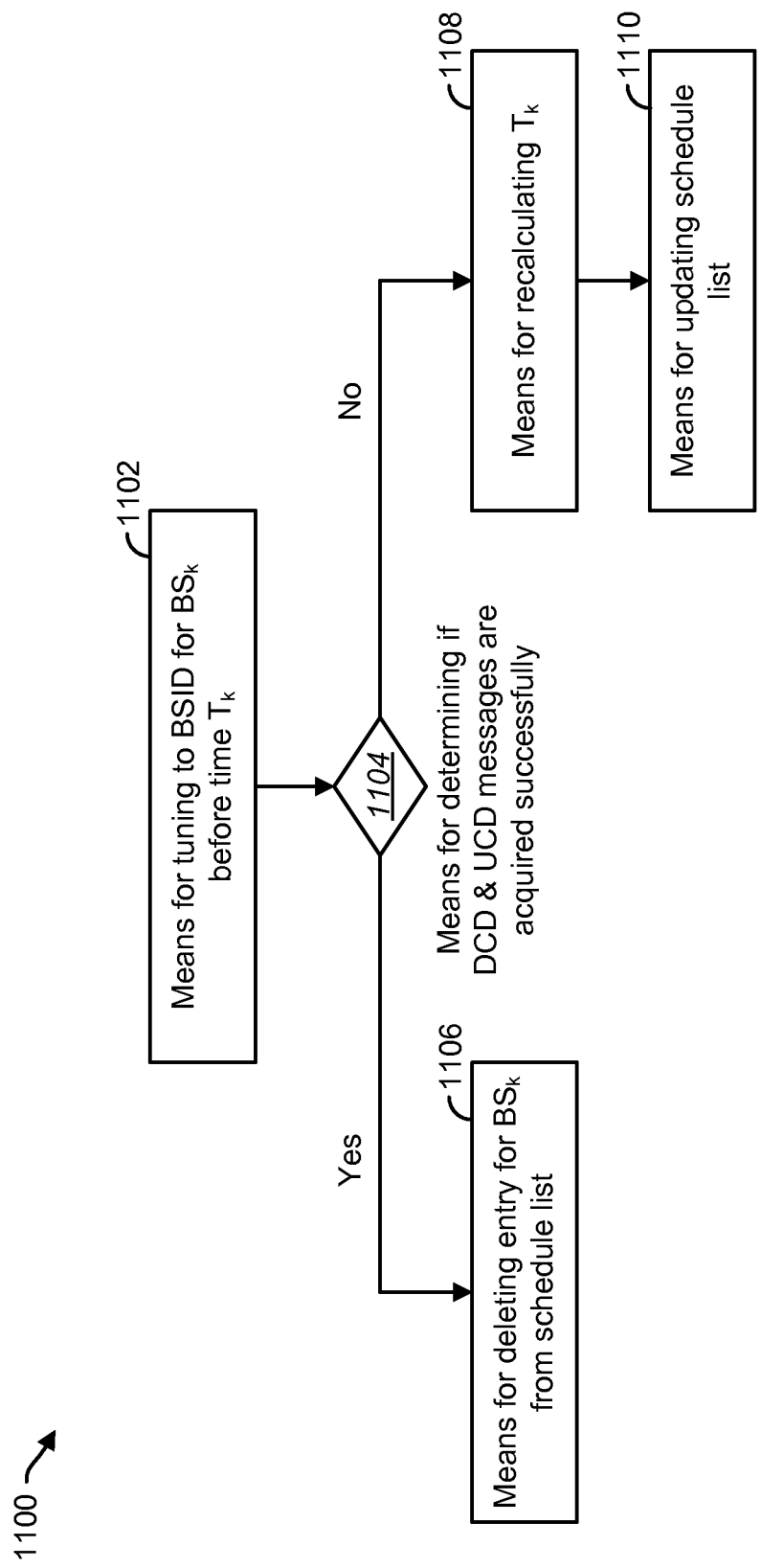
FIG. 11 illustrates means-plus-function blocks corresponding to the method of FIG. 10.

The method 1000 of FIG. 10 described above may be performed by various hardware and/or software component(s) and/or module(s) corresponding to the means-plus-function blocks 1100 illustrated in FIG. 11. In other words, blocks 1002 through 1010 illustrated in FIG. 10 correspond to means-plus-function blocks 1102 through 1110 illustrated in FIG. 11.

Reference is now made to FIG. 12. FIG. 12 illustrates an example of a method 1200 that may be implemented by a mobile station if there is a conflict between the scheduled times for DCD and UCD transmission from different base stations. In the present discussion, it will be assumed that it is a conflict between the scheduled times for DCD and UCD transmission from two base stations, which will be referred to as $BS_i$ and $BS_j$.

In the depicted method 1200, the mobile station receives 1202 DCD and UCD messages from $BS_i$ at time $T_i$. In the present discussion, it will be assumed that the next entry in the schedule list corresponds to $BS_j$. The scheduled time for DCD and UCD transmission for $BS_j$ will be referred to as $T_j$. However, it may occur that the mobile station determines 1204 that $T_j$ has passed, i.e., there is a conflict between $T_i$ and $T_j$.

The mobile station may still tune 1206 to the BSID for $BS_j$ immediately using the physical parameters obtained earlier to speed up RF tuning and timing acquisition. The mobile station may then recalculate 1208 $T_j$ and update 1210 the schedule list based on the recalculated version of $T_j$. In other words, the mobile station may replace the old value of $T_j$ with the recalculated value of $T_j$.

The method 1200 of FIG. 12 described above may be performed by various hardware and/or software component(s) and/or module(s) corresponding to the means-plus-function blocks 1300 illustrated in FIG. 13. In other words, blocks 1202 through 1210 illustrated in FIG. 12 correspond to means-plus-function blocks 1302 through 1310 illustrated in FIG. 13.

Figure 14:
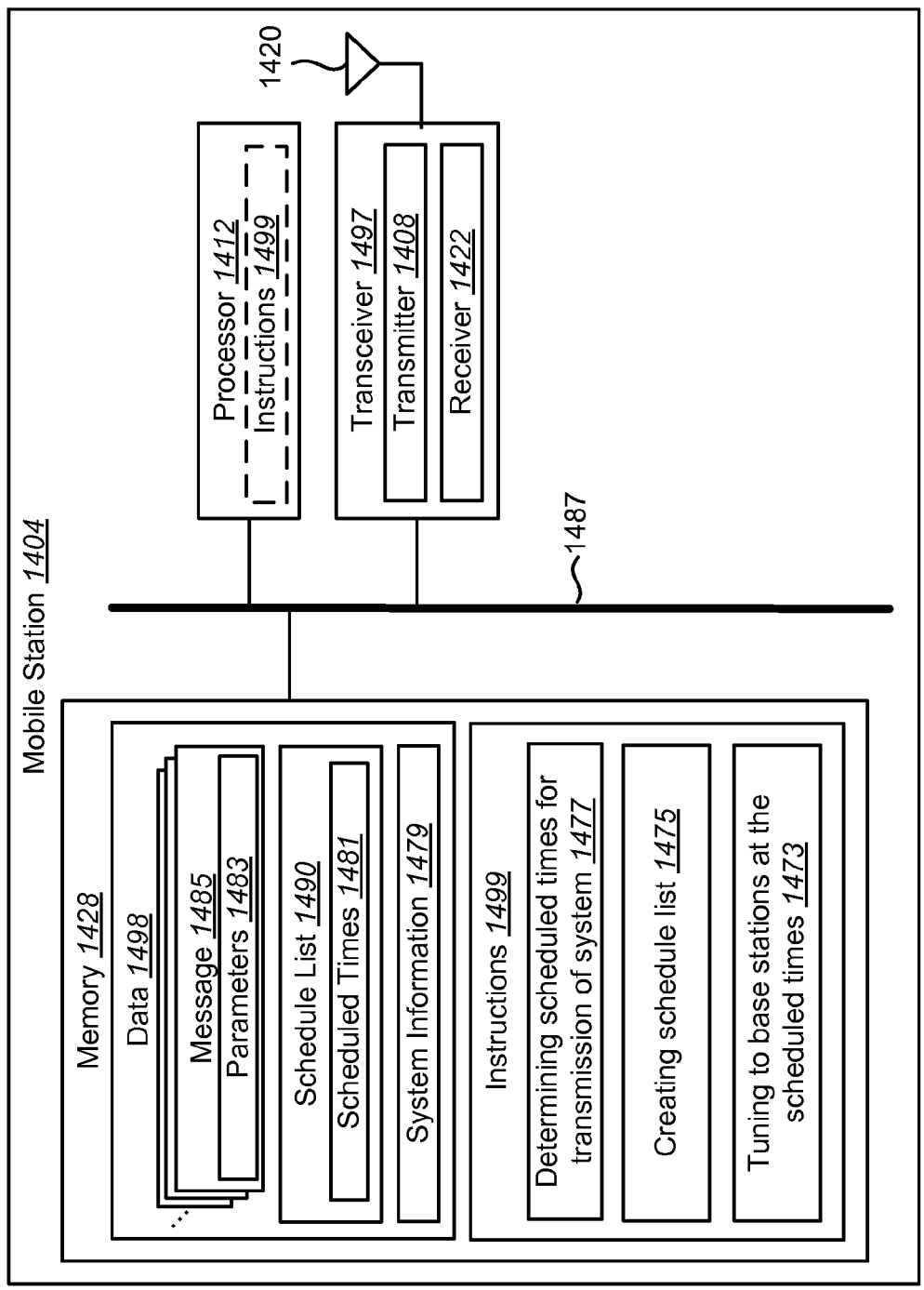
FIG. 14 illustrates certain components that may be included within a mobile station that is configured for parallel acquisition of system information from multiple base stations in accordance with the present disclosure.

Reference is now made to FIG. 14. FIG. 14 illustrates certain components that may be included within a mobile station 1404 that is configured for parallel acquisition of system information from multiple base stations in accordance with the present disclosure.

The mobile station 1404 includes a processor 1412. The processor 1412 may be a general purpose single- or multi-chip microprocessor (e.g., an ARM), a special purpose microprocessor (e.g., a digital signal processor (DSP)), a microcontroller, a programmable gate array, etc. The processor 1412 may be referred to as a central processing unit (CPU). Although just a single processor 1412 is shown in the mobile station 1404 of FIG. 14, in an alternative configuration, a combination of processors (e.g., an ARM and DSP) could be used.

The mobile station 1404 also includes memory 1428. The memory 1428 may be any electronic component capable of storing electronic information. The memory 1428 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1498 and instructions 1499 may be stored in the memory 1428. The instructions 1499 may be executable by the processor 1412 to implement various functions. Executing the instructions 1499 may involve the use of the data 1498 that is stored in the memory 1428.

Some examples of the data 1498 in the memory 1428 include: multiple messages 1485 which may include various parameters 1483, scheduled times 1481 within a schedule list 1490, system information 1479 that is acquired from various base stations, etc. The messages 1485 may include, for example, DL-MAP messages from various base stations. The parameters 1483 in the messages 1485 may include the base station identifier (BSID), the current_frame_number parameter, the DCD_UCD_Tx_Frame parameter, the frame_duration parameter, etc. The system information 1479 may include DCD and UCD messages from various base stations. Other types of data 1498 that are relevant to implementing the techniques described herein may also be included in the memory 1428.

Some examples of the instructions 1499 in the memory 1428 include: instructions for determining 1477 scheduled times 1481 for transmission of the system information 1479 from the multiple base stations based on parameters 1483 included in messages 1485 from the multiple base stations; instructions for creating 1475 a schedule list 1490 that comprises the schedule times 1481; and instructions for tuning 1473 to the base stations at the scheduled times 1481 that are specified in the schedule list 1490 in order to receive the system information 1479 from the base stations. Other instructions 1499 that are relevant to implementing the techniques described herein may also be included in the memory 1428.

The mobile station 1404 may also include a transmitter 1408 and a receiver 1422 to allow transmission and reception of signals between the mobile station 1404 and a remote location. The transmitter 1408 and receiver 1422 may be collectively referred to as a transceiver 1497. An antenna 1420 may be electrically coupled to the transceiver 1497. The mobile station 1404 may also include (not shown) multiple transmitters, multiple receivers, multiple transceivers and/or multiple antenna.

The various components of the mobile station 1404 may be coupled together by one or more buses, which may include a power bus, a control signal bus, a status signal bus, a data bus, etc. For the sake of clarity, the various buses are illustrated in FIG. 14 as a bus system 1487.

The techniques described herein may allow a mobile station to speed up acquisition of the system information (e.g., DCD and UCD messages) from multiple base stations. When multiple base stations are in the coverage area for a particular mobile station and the mobile station needs to acquire their DCD and UCD messages, the mobile station may be able to complete the acquisition in about the same amount of time as would be required for a single base station. Accordingly, the techniques described herein can reduce the latency of initial network selection, handoff preparation and cell reselection in idle mode.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "mobile station 1404" refers to the specific mobile station that is shown in FIG. 14. However, the use of "mobile station" without a reference number refers to any mobile station that is appropriate for the context in which the term is used, and is not limited to any particular mobile station shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6, 10 and 12, can be downloaded and/or otherwise obtained by a mobile station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for acquisition of system information from multiple base stations, the method being implemented by a mobile station, the method comprising:
   determining scheduled times for transmission of the system information from the multiple base stations based on parameters included in messages from the multiple base stations;
   creating a schedule list that comprises the scheduled times;
   tuning to the base stations at the scheduled times that are specified in the schedule list in order to receive the system information from the base stations; and
   recalculating the scheduled time for a particular base station and updating the schedule list to include the recalculated scheduled time if the mobile station does not receive the system information for the particular base station according to the scheduled time for that base station.

2. The method of claim 1, wherein the system information comprises Downlink Channel Descriptor (DCD) and Uplink Channel Descriptor (UCD) messages.

3. The method of claim 1, wherein the messages from the multiple base stations comprise downlink MAP (DL-MAP) messages.

4. The method of claim 1, wherein the parameters comprise a Downlink Channel Descriptor (DCD) and Uplink Channel Descriptor (UCD) transmission frame parameter, a frame duration parameter, and a current frame number parameter.

5. The method of claim 1, further comprising:
   scanning for available base stations; and
   acquiring physical parameters and downlink MAP (DL-MAP) messages from the multiple base stations.

6. The method of claim 5, wherein determining the scheduled times for transmission of the system information comprises parsing the DL-MAP messages received from the multiple base stations.

7. A method for acquisition of system information from multiple base stations, the method being implemented by a mobile station, the method comprising:
   determining scheduled times for transmission of the system information from the multiple base stations based on parameters included in messages from the multiple base stations, wherein a scheduled time for transmission of the system information from base station i is determined as $T_i = S_i + (\text{current\_frame\_number} - \text{DCD\_UCD\_Tx\_Frame}) \mod 128 \text{frame\_duration}$, wherein $T_i$ represents the scheduled time, $S_i$ represents a time when a current frame starts, current\_frame\_number indicates a frame number in which a downlink MAP message is received, DCD_UCD_Tx_Frame indicates a frame number in which a Downlink Channel Descriptor and Uplink Channel Descriptor are transmitted from the base station i, and Frame_duration indicates a duration of a frame;

creating a schedule list that comprises the scheduled times; and tuning to the base stations at the scheduled times that are specified in the schedule list in order to receive the system information from the base stations.

8. A method for acquisition of system information from multiple base stations, the method being implemented by a mobile station, the method comprising:

determining scheduled times for transmission of the system information from the multiple base stations based on parameters included in messages from the multiple base stations;

creating a schedule list that comprises the scheduled times; and tuning to the base stations at the scheduled times that are specified in the schedule list in order to receive the system information from the base stations, wherein, if there is a conflict between a first scheduled time for transmission of the system information from a first base station and a second scheduled time for transmission of the system information from a second base station, the method further comprises:

tuning to a base station identifier for the second base station after the system information is received from the first base station;

recalculating the scheduled time for transmission of the system information from the second base station; and updating the schedule list to include the recalculated scheduled time for transmission of the system information from the second base station.

9. A mobile station configured for acquisition of system information from multiple base stations, comprising:

a processor;

memory in electronic communication with the processor;

instructions stored in the memory, the instructions being executable by the processor to:

determine scheduled times for transmission of the system information from the multiple base stations based on parameters included in messages from the multiple base stations;

create a schedule list that comprises the scheduled times; and tune to the base stations at the scheduled times that are specified in the schedule list in order to receive the system information from the base stations; and recalculate the scheduled time for a particular base station and update the schedule list to include the recalculated scheduled time if the mobile station does not receive the system information for the particular base station according to the scheduled time for that base station.

10. The mobile station of claim 9, wherein the system information comprises Downlink Channel Descriptor (DCD) and Uplink Channel Descriptor (UCD) messages.

11. The mobile station of claim 9, wherein the messages from the multiple base stations comprise downlink MAP (DL-MAP) messages.

12. The mobile station of claim 9, wherein the parameters comprise a Downlink Channel Descriptor (DCD) and Uplink Channel Descriptor (UCD) transmission frame parameter, a frame duration parameter, and a current frame number parameter.

13. The mobile station of claim 9, wherein the instructions are also executable to:

scan for available base stations; and acquire physical parameters and downlink MAP (DL-MAP) messages from the multiple base stations.

14. The mobile station of claim 13, wherein determining the scheduled times for transmission of the system information comprises parsing the DL-MAP messages received from the multiple base stations.

15. A mobile station configured for acquisition of system information from multiple base stations, comprising:

a processor;

memory in electronic communication with the processor;

instructions stored in the memory, the instructions being executable by the processor to:

determine scheduled times for transmission of the system information from the multiple base stations based on parameters included in messages from the multiple base stations, wherein a scheduled time for transmission of the system information from base station i is determined as $T_i=S_i+(\text{current\_frame\_number}-\text{DCD\_UCD\_Tx\_Frame}) \mod 128*\text{frame\_duration}$, wherein $T_i$ represents the scheduled time, $S_i$ represents a time when a current frame starts, current_frame_number indicates a frame number in which a downlink MAP message is received, DCD_UCD_Tx_Frame indicates a frame number in which a Downlink Channel Descriptor and Uplink Channel Descriptor are transmitted from the base station i, and frame_duration indicates a duration of a frame;

create a schedule list that comprises the scheduled times; and tune to the base stations at the scheduled times that are specified in the schedule list in order to receive the system information from the base stations.

16. A mobile station configured for acquisition of system information from multiple base stations, comprising:

a processor;

memory in electronic communication with the processor;

instructions stored in the memory, the instructions being executable by the processor to:

determine scheduled times for transmission of the system information from the multiple base stations based on parameters included in messages from the multiple base stations;

create a schedule list that comprises the scheduled times; and tune to the base stations at the scheduled times that are specified in the schedule list in order to receive the system information from the base stations, wherein, if there is a conflict between a first scheduled time for transmission of the system information from a first base station and a second scheduled time for transmission of the system information from a second base station, the instructions are also executable to:

tune to a base station identifier for the second base station after the system information is received from the first base station;

recalculate the scheduled time for transmission of the system information from the second base station; and update the schedule list to include the recalculated scheduled time for transmission of the system information from the second base station.

17. A receiving apparatus configured for acquisition of system information from multiple transmission devices, comprising:
- means for determining scheduled times for transmission of the system information from the multiple transmission devices based on parameters included in messages from the multiple transmission devices;
- means for creating a schedule list that comprises the scheduled times;
- means for tuning to the multiple transmission devices at the scheduled times that are specified in the schedule list in order to receive the system information from the multiple transmission devices; and
- means for recalculating the scheduled time for a particular transmission device and updating the schedule list to include the recalculated scheduled time if the receiving apparatus does not receive the system information for the transmission device according to the scheduled time for the transmission device.

18. The receiving apparatus of claim 17, wherein the system information comprises Downlink Channel Descriptor (DCD) and Uplink Channel Descriptor (UCD) messages.

19. The receiving apparatus of claim 17, wherein the messages from the multiple transmission devices comprise downlink MAP (DL-MAP) messages.

20. The receiving apparatus of claim 17, wherein the parameters comprise a Downlink Channel Descriptor (DCD) and Uplink Channel Descriptor (UCD) transmission frame parameter, a frame duration parameter, and a current frame number parameter.

21. The receiving apparatus of claim 17, further comprising:
- means for scanning for available transmission devices; and
- means for acquiring physical parameters and downlink MAP (DL-MAP) messages from the multiple transmission devices.

22. A non-transitory computer-readable medium having instructions thereon, the instructions comprising:
- code for determining scheduled times for transmission of the system information from the multiple base stations based on parameters included in messages from the multiple base stations;
- code for creating a schedule list that comprises the scheduled times;
- code for tuning to the base stations at the scheduled times that are specified in the schedule list in order to receive the system information from the base stations; and
- code for recalculating the scheduled time for a particular base station if the mobile station does not receive the system information for the base station according to the scheduled time for the base station.

23. The non-transitory computer-readable medium of claim 22, wherein the system information comprises Downlink Channel Descriptor (DCD) and Uplink Channel Descriptor (UCD) messages.

24. The non-transitory computer-readable medium of claim 22, wherein the messages from the multiple base stations comprise downlink MAP (DL-MAP) messages.

25. The non-transitory computer-readable medium of claim 22, wherein the parameters comprise a Downlink Channel Descriptor (DCD) and Uplink Channel Descriptor (UCD) transmission frame parameter, a frame duration parameter, and a current frame number parameter.

26. The non-transitory computer-readable medium of claim 22, wherein the instructions further comprise:
- code for scanning for available base stations; and
- code for acquiring physical parameters and downlink MAP (DL-MAP) messages from the multiple base stations.

* * * * *